Figure 1:
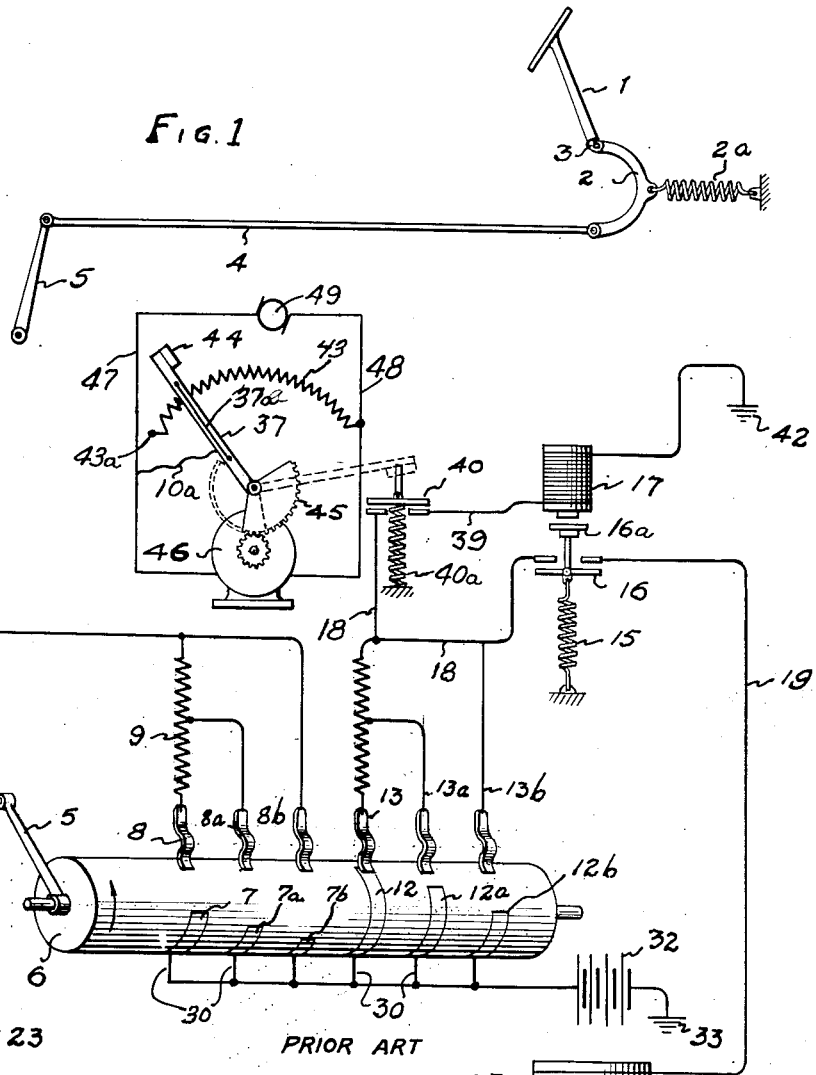

March 18, 1952     E. H. PIRON     2,590,034
SEQUENTIAL BRAKING SYSTEM

Filed Sept. 9, 1948     2 SHEETS—SHEET 1

Inventor
EMIL H. PIRON
By
ATTORNEY

March 18, 1952 E. H. PIRON 2,590,034
SEQUENTIAL BRAKING SYSTEM
Filed Sept. 9, 1948
2 SHEETS—SHEET 2

Inventor
Emil H. Piron
By
[signature]
ATTORNEY

Patented Mar. 18, 1952

2,590,034

UNITED STATES PATENT OFFICE 2,590,034

SEQUENTIAL BRAKING SYSTEM

Emil H. Piron, New York, N. Y., assignor to Transit Research Corporation, New York, N. Y., a corporation of New York Application September 9, 1948, Serial No. 48,439

9 Claims. (Cl. 172—285)

This invention relates to brakes for rail vehicles and more particularly to a novel sequence for the operation of the several types of brakes now in use on transit rail vehicles.

The modern vehicle of this type is equipped (1) with a dynamic brake in which the circuits of the driving motors are switched for the excitation of the motors in such manner that they no longer act as traction motors but as electric generators, sending their current into automatically controlled resistors and using the kinetic energy of the car in motion for the production of electrical energy for braking purposes; (2) with friction shoes which act against the treads of the wheels or against a drum carried by the wheels or by the propeller shafts of the driving motors; and (3) with track brake shoes which are drawn to the tracks by a magnetic field which is established by introducing current into coils carried by the track shoes.

It is the custom to operate such brakes in a predetermined sequence called for by various positions of a brake pedal. The conventional sequence on modern street cars, for instance, is as follows; the numbered pedal positions being arbitrarily chosen by a more or less equal division of the distance through which the brake pedal is depressed:

| Pedal position | Dynamic brake | Friction brake | Track brake |
|---|---|---|---|
| 1 | starts | | |
| 2 | 1st step | 1st step | |
| 3 | 2nd step | 2nd step | |
| 4 | 3rd step | 3rd step | |
| 5 | Max | Max | |
| 6 | Max | Max | 1st step |
| 7 | Max | Max | 2nd step |
| 8 | Max | Max | 3rd step |

In this sequence the friction brake is set by organs controlled by the position of the pedal and is readied for action, as indicated, but locked out, i. e. prevented from acting, as long as the dynamic brake is acting. It comes into action whenever the action of the dynamic brake becomes nil or practically nil, whether because the motor current fades due to loss of speed of the car or fails due to an accidental break in the motor circuits.

The track brake, having only one set of contacts, always comes into action independently of the action of the dynamic and friction brakes and supplements their action whenever the pedal is moved to portion 6, or further.

An object of this invention is to provide an improved braking sequence in which the same brakes will be available for use but which will give improved safety under especially severe or hazardous operations.

More particularly, it is an object of this invention to provide an improved braking sequence which will function as above described under normal braking conditions where the dynamic brake gradually fades out but which will, automatically, alter its sequence to employ both the track brakes and the friction brakes as service brakes when the dynamic brake fails due to an interruption of current in the main motor circuits. The alternative sequences will then be as follows:

| Pedal position | Dynamic brake | Friction brake | Track brake contact set A | Track brake contact set B |
|---|---|---|---|---|
| 1 | starts | | | |
| 2 | 1st step | 1st step | | 1st step. |
| 3 | 2nd step | 2nd step | | 2nd step. |
| 4 | 3rd step | 3rd step | | 3rd step. |
| 5 | Max | Max | | |
| 6 | Max | Max | 1st step | |
| 7 | Max | Max | 2nd step | |
| 8 | Max | Max | 3rd step | |

In this sequence, the action of the dynamic brake, that of the friction brake and that of the track brake connected with contact set A are the same as previously, but the action of the track brake connected with contact set B is prevented by the dynamic brake as long as the latter is in action. However, it comes into action as soon as the dynamic brake fades out or fails.

Figure 2:
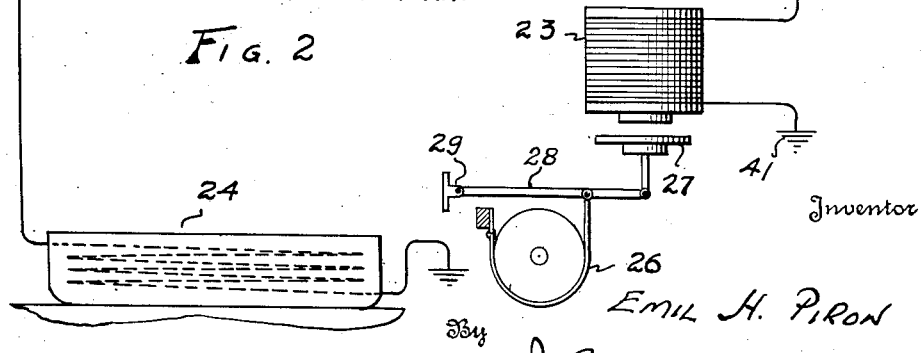
Figure 3:
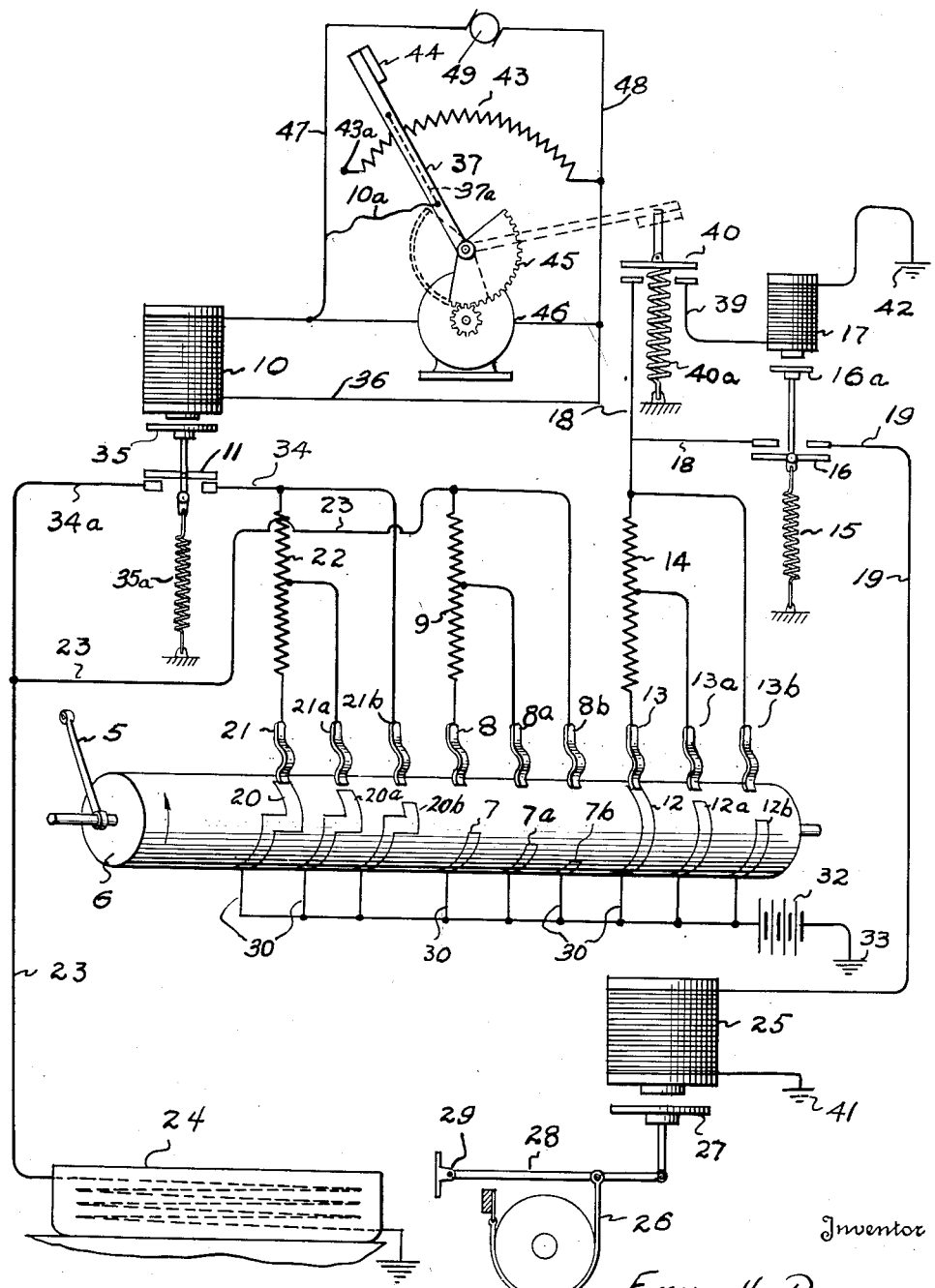

A better understanding of the invention will be had by reference to the accompanying drawings in which one embodiment of my invention is diagrammatically illustrated and in which Figure 1 shows a brake pedal with linkages capable of operating a brake controller, Figure 2 is a diagrammatic showing of the brake controller operated by the pedal of Figure 1 according to present conventional braking arrangement, and Figure 3 is a diagrammatic showing of the brake controller operated by the pedal of Figure 1, according to my invention and including all of the showing of Figure 2.

Since a brake controller is highly complicated and has a great number of parts and electrical circuits not pertinent to this invention and since dynamic brakes are old and well-known in the art, only that part of the dynamic brakes pertinent to this invention is illustrated.

1 indicates a brake pedal pivoted at 3 and having an integral arm 2 pivotally connected to a link 4 which, in turn is pivotally connected to an arm 5. Depression of the pedal 1 compresses a spring 2a.

The following description may be read only with reference to Figure 3, which includes all of the showing of Figure 2, Figure 2 being included in order to clarify the explanation of the differences between a conventionally used braking system and the additions thereto which, in themselves and in their combination with the conventional system illustrated, constitute the subject matter of this invention.

The arm 5 is rigidly secured to an electrically insulated cylinder 6, the diagrammatic showing of which is greatly simplified in order to simplify the explanation of its function. This cylinder carries a plurality of arcuate spaced terminals 7, 7a and 7b of varying lengths, the terminal 7 being longer than the terminal 7a, and 7a being longer than 7b. Also on the cylinder is another similar set of terminals 12, 12a and 12b similarly varying in length with the terminal 12. The terminals of series 7 are much shorter than those of series 12 so as to establish contacts only after all those of series 12 are engaged.

A series of contacts 8, 8a, 8b, 13, 13a and 13b in Figures 2 and 3 and also 21, 21a and 21b shown only in Figure 3, have spring pressed ends for engagement with the cylinder 6, these fingers being so spaced along the cylinder that upon rotation of the cylinder 6 the contacts 8, 8a and 8b will progressively and respectively contact the terminals 7, 7a and 7b, and so that the contacts 13, 13a and 13b will progressively and respectively contact the terminals 12, 12a and 12b.

As shown in Figure 3, the cylinder 6 is provided with three additional terminals 20, 20a and 20b approximately equal in length, respectively, with the terminals of series 7, but angularly displaced on cylinder 6 so that they engage their contacts at about the same angular position as terminals of series 12 but lose their contacts just before the first of the terminals of series 7 engage.

Each terminal of the series 7, 12 and 20 is connected by a lead 30 to a line 31 and to a battery 32. The battery is grounded at 33.

The contact 8 is connected to one end of a resistor 9, the other end of this resistor being connected to a line 23 leading to the actuating coil carried internally of the magnetic track brakes 24. The contactor 8a is connected to the resistor 9 intermediate the length of the resistor and the contactor 8b is connected to the line 23 at the end of the resistor. While only one intermediate contactor 8a is illustrated, obviously this one may be considered as symbolic of a plurality of such intermediate contactors. Current from the battery 32 can thus be supplied to the magnetic brake shoes 24 if the cylinder 6 is rotated sufficiently to close the contact 8 on the terminal 8 and thereafter according to the amount of rotation of said cylinder. In Figure 3, with the additional terminal series 20, contact 21 is connected to one end of a resistor 22, the other end of which is connected to a line 34 leading to a terminal of a switch 11. The other terminal of this switch is connected by a line 34a to the line 23 of the magnetic track brake 24. The contact 21a is connected to the resistor 22, intermediate the length of the resistor and the contactor 21b is connected to the line 34 at the end of the resistor.

The switch 11 of Figure 3 is associated with a solenoid 10 connected at one side by the line 36 to one side of the main motor 49, which becomes a generator for dynamic braking, and connected at its other side by the line 10a to the return line 47 of the generator.

The contactors 13, 13a and 13b are connected respectively to one end of a resistor 14, to the middle thereof and to the other end thereof, the contactor 13a being understood to be symbolic of a plurality of contactors intermediate the ends of said resistor. The outer or upper end of the resistor 14 is connected by a line 18 to one terminal of a switch 16 and to one terminal of a switch 40. Closing of the switch 40 against the pressure of spring 40a establishes a circuit between the line 18 and a line 39, as will be described, while closing of the switch 16 establishes a circuit between the line 18 and a line 19 whereby a solenoid 25 is energized. This solenoid 25 is grounded at 41. Energization of the solenoid 25 attracts an armature 27 which actuates the brake arm 28 of a friction brake 26, the arm 28 being pivoted at 29.

Closing of the switch 40 depends upon the swinging of a rheostat arm 37 to its starting position, as indicated by the dotted lines. This arm is a part of the dynamic brake as will be described. The switch 16 which is normally held open by the spring 15 is connected to an armature 16a for the closing thereof when said armature is actuated by energization of a solenoid 17, this solenoid being grounded at one side 42 and connected at its other side to the line 39. This solenoid is thus energized by the battery 32 when the switch 40 is closed and contact is made between any one of terminals 12 and 13.

The dynamic brake is composed, first, of the main motor 49 which, for braking, is disconnected from its source of current supply (not shown) and becomes a generator. It has a supply line 48 connected to one end of a rheostat 43 which terminates at a point 43a, the line 48 also being connected to one side of a pilot motor 46. The arm 37, previously mentioned, is carried by the shaft of a gear 45 driven from a gear on the shaft of the pilot motor 46, and in turn, carries a conductor 37a. This conductor rides the resistance of the rheostat 43 and is connected at its lower end to the return line 47 of the generator 49. The line 47 originates at one end at the pilot motor 46. According to conventional operation, the arm 37 "floats" and swings to various positions varying with the resistance 43 to protect the main motor against excessive current and overheating. Thus, if the vehicle is being propelled and the power is shut off preparatory to braking, the main motors become generators and the arm 37 will swing to some position, such as is shown in full lines, under the influence of the motor 46. As the vehicle slows down the current from the generator 49 gradually fades, less current is supplied to the pilot motor 46 which gradually moves the arm 37 to the right, thus cutting out more and more resistance, until the arm 37 is finally returned to its extreme position shown in dotted lines. The generator 49 will continue to exert a braking effort so long as current continues to flow therefrom and so long as current does flow, the line 10a and the solenoid will be energized. The arm 37 will be returned to starting position before the line 48 is completely de-energized.

The operation of the two systems will now be described. The operator of the vehicle presses the foot pedal 1, Figure 1, which actuates the linkage 2, 4 and 5 thus causing rotation of the cylinder 6. As soon as the lever 5 and cylinder 6 are moved through a small angle from their initial position to occupy the position shown in Figure 2 or 3, all contacts are then set for the automatic operation of the dynamic brakes—that is, for the excitation of the traction motors of the vehicle in such manner that they no longer act as traction motors but as generators. The circuits, switches, etc. for causing the motors thus to be converted to generators are not shown because they are well understood in the art, it being sufficient for an understanding of this invention to say that the motors are converted to generators for operation as dynamic brakes when the arcuate terminal 13 contacts the terminal 12. The arm 37 swings to some point, as for instance, to the position shown in full lines.

With the closing of the contactor 13 and terminal 12, a potential is established in the resistor 14 and in the line 18 but the switch 16 is held open by the spring 15.

Substantially simultaneously with the closing of the contacts 13, 13a and 13b on the terminals 12, 12a and 12b, the contacts 21, 21a, and 21b close respectively on the terminals 20, 20a and 20b thus creating a potential in the line 34. The switch arm 35 which is capable of closing to establish a circuit between the line 34 and the lines 34a and 23 to the track brake 24 is held open by the solenoid 10 so long as this solenoid is energized. It is closed by the spring 35a when the solenoid becomes deenergized. The solenoid 10, being connected by a line 10a to the rheostat arm 37 of the dynamic brake, will be energized so long as the resistor 43, the arm 37 and the line 10a supply current thereto, and will lose its energization when the current supply fails.

If the pedal 1 were further depressed thus further rotating the cylinder 6 through a greater angle, contacts would be established between the terminals 12a, 12b and the contactors 13a, 13b respectively, thus reducing the amount of resistance 14. I thus provide for the progressive elimination of all of the resistance 14 in as many steps as desired depending only on the number of terminals and contactors one is willing to use, and so to regulate the current flowing through the circuit of friction brake 26 depending on the position of the brake pedal 1.

If pedal 1 is further depressed thus further rotating cylinder 6 through a still greater angle than terminals series 7 successively engage contact series 8 thus feeding circuit 23 through more or less of resistance 9 and feeding the solenoid of track brake 24 from battery 32 and adding its action to that of the other brakes. Thus far the braking action of both schemes shown in Figure 2 and Figure 3 is identical as long as the dynamic brake is active because the dynamic brake potential, through arm 37, line 10a and solenoid 10, to ground 36, keeps solenoid 10 energized, armature 35 up against tension of spring 35a and switch 11 open, preventing current to flow from line 34 to 34a and 23 to track brake 24 in spite of the fact that battery potential is carried through terminals series 20 to contacts series 21 and more or less of resistance 22 into line 34.

The automatic regulation of the dynamic brake is such that the accelerator arm 37 is moved clockwise or counterclockwise by the pilot motor 46 to cut resistance in and out of the dynamic brake circuit thus regulating the flow of current in the motors, acting as generators, thus automatically controlling the function of the dynamic brakes. As the speed of the vehicle becomes low, say one mile per hour or less, the current in the dynamic brake fades and the arm 37 returns to the starting position as indicated in dotted lines. The pad 44 on the end of the arm closes the switch 40; a current flow is established from battery 32 through the circuit 12, 13, 14, 18, 40, 39 to the solenoid 17 and ground 42 thus closing the switch 16 whereupon the line 19 and the solenoid 25 are energized by the battery 32 to apply the friction brake 26, which substitutes for the dynamic brake action.

The foregoing is conventional application of a well known presently used system. If the dynamic brakes fail in that system essentially the same action takes place since the arm 37 will eventually return to its starting position upon failure of current, the friction brake becomes the service brake and braking by the track brakes can be added simply by increased motion of pedal 1.

According to this invention, scheme Figure 3, the above system is also used where there is no failure of the dynamic brakes but if there is failure then the track brakes 24 instead of the friction brakes 26 become the service brakes, as will now be described.

Suppose that the pedal 1 has been depressed and the cylinder 6 rotated to the position shown in Figure 3. The arm 37 will be at some position other than its starting position and the solenoid 17 will be de-energized because switch 40 is open. Upon a current failure of the dynamic brakes the solenoid 10 will lose its energization and the spring 35a will cause the switch 11 to close thus establishing a circuit from the battery 32 to the line 23 thus applying the track brakes 24. As the dynamic brake then fades the arm 37 carrying the pad 44 will close the switch 40 thus energizing the line 39, and the solenoid 17. Energization of the solenoid 17 will then close the switch 16 thus causing also application of the friction brakes 26 when the switch 40 eventually closes. The effect will be to add the action of the friction brake to the track brake. The track brake is thus applied immediately and becomes the service brake once a failure of the dynamic brake occurs. The failure of the dynamic brake does not preclude its participation in the braking in the event that current is restored. For instance, if the track brake is being applied by the circuit 34, 11, 34a, 23 and current is restored to the dynamic brake the arm 37 will swing to its proper position, the solenoid 10 will be energized and current flow in the line 34, 34a will be interrupted.

It will be understood that in the case of normal operation with the arrangement as above described, the arm 37 will act to close the switch 40 before current has faded out entirely, with the result that the solenoid 10 will remain energized until after the friction brake has been applied. In actual operation the dynamic brake reduces the speed of the car below one mile per hour before the friction brake is applied, with the result that the track brake hardly participates in the normal braking.

The advantages are that, the track brakes respond considerably faster than do the friction brakes and are mechanically capable of withstanding such use without wearing as fast as friction brakes. The action is thus faster and safer and, it so happens, also much more economical to construct than increasing the capacity of the friction brakes as would otherwise be necessary for the severer classes of service such as is encountered in rapid transit.

What I claim is:

1. In a braking system for an electrically propelled vehicle, a dynamic brake, a friction brake and a track brake, automatic means operative in response to the setting of a manual controller for applying said brakes according to a predetermined normal braking sequence, and means operative in response to the failure of current in said dynamic brake at any time during a braking operation thereof for applying both said friction brake and said track brake but in reverse order with respect to said sequence.

2. In a braking system for an electrically propelled vehicle, a dynamic brake, a friction brake and a track brake, automatic means responsive to the setting of a manual controller for applying and for maintaining the application of said dynamic brake until current fades therein and for applying said friction brake upon the fading of current in said dynamic brake, and automatic means operative at all brake settings of said manual controller for applying said track brake at any time either in response to failure of said dynamic brake to respond as called for by said controller or in response to a complete fade-out of current in said dynamic brake.

3. In a braking system for an electrically propelled vehicle, a dynamic brake, a friction brake and a track brake, a controller manually rotatable to a plurality of positions to condition said brakes for automatic operation according to predetermined sequences, said controller upon initial movement conditioning said dynamic brakes for actuation and upon movement through a secondary range also conditioning said friction brake and said track brake for actuation, means locking out said friction brake and said track brake so long as said dynamic brake functions as a brake, automatic means responsive to the fading of said dynamic brake for applying said friction brake while still locking out said track brake so long as current still exists in said dynamic brake, said controller upon movement through a third zone maintaining the conditioning of said friction brake for operation and conditioning said track brake for immediate application, and means responsive to the last described movement of said controller for applying said track brake irrespective of current flow in said dynamic brake.

4. In a braking system for an electrically propelled vehicle, a dynamic brake, a friction brake and a track brake, a controller manually rotatable to a plurality of positions to condition said brakes for automatic operation according to predetermined sequences, said controller upon initial movement conditioning said dynamic brakes for actuation and upon movement through a secondary range also conditioning said friction brake and said track brake for actuation, means locking out said friction brake and said track brake so long as said dynamic brake functions as a brake, means applying said friction brake as a service brake upon fading of said dynamic brake automatic means responsive immediately to current failure in said dynamic brakes for applying said track brake, and automatic means responsive to continued failure of current in said dynamic brake for subsequently applying said friction brake.

5. In a braking system for an electrically propelled vehicle, a dynamic brake, a friction brake and a track brake, a controller manually rotatable to a plurality of positions to condition said brakes for automatic operation according to predetermined sequences, said controller upon initial movement conditioning said dynamic brakes for actuation and upon movement through a secondary range also conditioning said friction brake and said track brake for actuation, means locking out said friction brake and said track brake so long as said dynamic brake functions as a brake, automatic means responsive to the fading of said dynamic brakes for applying said friction brake while still locking out said track brake so long as current still exists in said dynamic brake, automatic means responsive to the failure of current in said dynamic brake for applying said track brake, said controller upon movement through a third zone maintaining the conditioning of said friction brake and conditioning said track brake for immediate application, and means responsive to the last described movement of said controller for applying said track brake irrespective of the extent of fading by said dynamic brake.

6. In a braking system for an electrically propelled vehicle, a dynamic brake, a friction brake for the propeller shaft of the vehicle and a track brake, manual control means operable to condition all of said brakes for sequential operation, and automatic means responsive to a current failure in said dynamic brake at any time during operation thereof causing application of both said friction brake and said track brake.

7. In a braking system for an electrically propelled vehicle, a dynamic brake, a friction brake and a track brake, manual control means for conditioning all of said brakes for sequential operation, a lock-out device operable in response to the fading of current in said dynamic brake for establishing a circuit to apply said friction brake, and a second lock-out device operable in response to a cessation of current in said dynamic brake for applying said track brake whereby said track brake is applied during normal braking operations subsequent to the application of said friction brake, both of said lock-outs being automatically operable to apply said friction brake and said track brake in response to failure of current at any time.

8. In a braking system for an electrically propelled vehicle, a dynamic brake, a friction brake and a track brake, manual control means for conditioning all of said brakes for sequential operation, a lock-out device operable in response to the fading of current in said dynamic brake for establishing a circuit to apply said friction brake, and a second lock-out device operable in response to a cessation of current in said dynamic brake for applying said track brake whereby said track brake is applied during normal braking operations subsequent to the application of said friction brake, both of said lock-outs being automatically operable to apply said friction brake and said track brake in response to failure of current at any time, said friction brake being subject to control by at least one relay dependent for energization upon closure of said first named lock-out, thereby entailing a time lag in the application of said friction brake upon interruption of current in said dynamic brake, said track brake being applied immediately and in advance of said friction brake upon interruption of current in said dynamic brake.

9. In a braking system for an electrically propelled vehicle, a dynamic brake, a friction brake and a track brake, automatic means responsive to the setting of a manual controller for applying said dynamic brake and for maintaining the application thereof so long as current flows therein, said automatic means conditioning said friction brake and said track for application of both thereof in the event of failure of current in said dynamic brake at any time and for sequential operation, said manual controller being operative also to apply said track brake at any desired time irrespective of a flow of current in said dynamic brake.

EMIL H. PIRON.

REFERENCES CITED

The following references are of record in the file of this patent:

UNITED STATES PATENTS

| Number | Name | Date |
|---|---|---|
| 2,078,648 | Willby | Apr. 27, 1937 |
| 2,257,301 | Larson | Sept. 30, 1941 |
| 2,257,302 | Larson | Sept. 30, 1941 |
| 2,366,029 | Hines | Dec. 26, 1944 |